United States Patent [19]

Johnson

[11] Patent Number: 4,460,805
[45] Date of Patent: Jul. 17, 1984

[54] STRAIN RELIEF GROMMET

[75] Inventor: Kenneth L. Johnson, Warren, Pa.

[73] Assignee: Betts Industries, Inc., Warren, Pa.

[21] Appl. No.: 380,135

[22] Filed: May 20, 1982

[51] Int. Cl.³ .................. H02G 3/22; H01B 17/30; F16L 5/00
[52] U.S. Cl. .................. 174/152 G; 16/2; 248/56
[58] Field of Search ........... 174/65 G, 152 G, 153 G; 16/2; 24/141; 248/56; 285/158; 339/103 B

[56] References Cited

U.S. PATENT DOCUMENTS

| 1,697,814 | 1/1929 | Forbes | 174/152 G |
| 2,820,088 | 1/1958 | Sperry | 174/152 G |
| 3,322,890 | 5/1967 | Kennedy et al. | 285/158 X |

Primary Examiner—Laramie E. Askin
Attorney, Agent, or Firm—Ralph Hammar

[57] ABSTRACT

A grommet and strain relief for rubber covered wire and the like comprising a tapered rubber plug having one or more wire receiving bores extending through the plug and each normally sealed by a membrane which is ruptured as the wire is inserted. The ruptured membrane grips the covering of the wire and forms a weatherproof seal.

2 Claims, 4 Drawing Figures

STRAIN RELIEF GROMMET

This invention is intended to provide a combined grommet and strain relief for rubber covered wire and the like which will form a weatherproof seal around the wire and provide a cushioned grip which will protect the wire from damage.

In the drawing, FIG. 1 is an elevation of the grommet;

Figure 1:
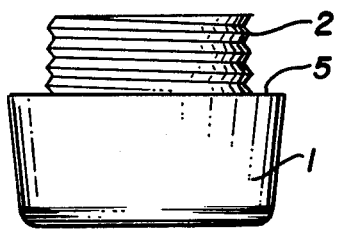
Figure 2:
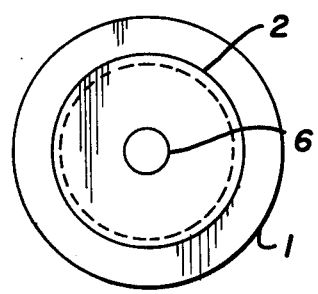
FIG. 2 is an end view of the grommet.
Figure 4:
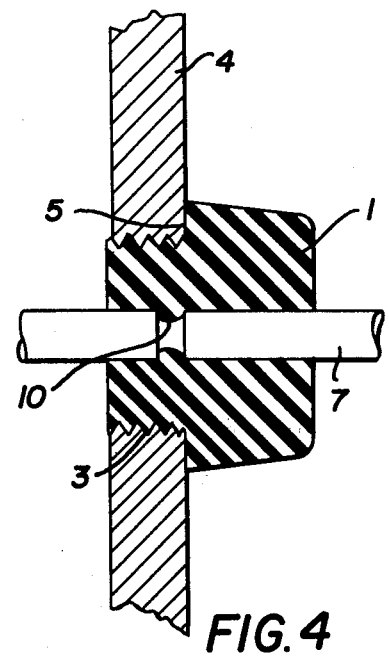
FIG. 4 is a section similar to FIG. 3 through the grommet when installed in a housing.
Figure 3:
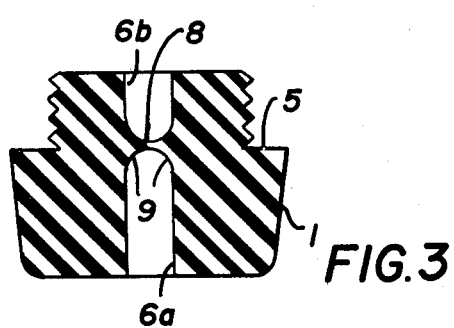
FIG. 3 is a sectional elevation of the grommet.

Referring to the drawing, the grommet has an enlarged head 1 and a tapered threaded shank 2. When the grommet is screwed into a tapped hole 3 in the wall 4 of a lamp housing or other structure, a shoulder 5 on the head seals against the outer surface of the wall 4 and cooperates with the screw threads in making a weatherproof connection to the wall. As the grommet is screwed into the opening 3, the shank 2 is compressed radially inward.

The grommet is preferably made of natural or synthetic rubber or other weather resistant elastomeric material so the seal between the grommet and the wall 4 is not affected by the weather. The term "rubber" is used to designate these materials and equivalents.

Extending axially through the grommet are one or more bores 6 for receiving rubber covered wire or cable 7. Although only one bore 6 is shown, the grommet shown has been made with three bores 6, and there is no theoretical reason why a larger number could not be used. The bore is normally closed by an internal membrane or diaphragm 8 peripherally united to the bore by a thick rim or fillets 9. So long as the membrane 8 is intact, the bore 6 is sealed and the grommet provides a weatherproof seal for the screw threaded hole 3.

When the rubber covered wire or cable 7 is to be mounted in the grommet 1, the end of the cable is first dipped in water or other rubber lubricant and is then forced through the end 6a of the bore 6, through the membrane 8 and out through the end 6b of the bore. The insertion of the wire 7 ruptures the center portion of the membrane 8, but leaves the fillet 9 intact. The result is the formation of an internal bead 10 which positively grips the wire and anchors it in place in the grommet. As soon as the water or other rubber lubricant has dried out or evaporated, it is essentially impossible to pull the wire or cable out of the grommet. The bead 10 provides a positive interlock which is supplemented by the compression grip of the rubber of the bore of the grommet on the outer surface of the rubber covering on the wire. The rubber covering on the wire has a tight fit in the bore 16. The bead 10 is located in the region of maximum compression of the rubber resulting from the screwing of the grommet into the opening 3. The massive section of the head 1 and the length of the bore 6 within the head holds the rubber in place and contributes to the grip on the rubber covering of wire 7 and to the seal between the grommet and the rubber covering.

I claim:

1. A grommet comprising a molded rubber body having a bore extending through the body for receiving a rubber covered wire or cable, an internal membrane normally closing said bore, said membrane having a thick rim peripherally united with the inner surface of the bore and said membrane further having a thin center section, said thick rim being so shaped and dimensioned as to permit a rubber covered wire or cable of a diameter equal to the diameter of said bore to be forced through and rupture said thin center section, said thick rim remaining after rupture of said center section.

2. The grommet of claim 1 in which the body has a screw threaded shank at one end and an enlarged head at the other end, said shank upon being screwed into a threaded hole compressing the rubber of said bore radially inward in the region of said thick rim.

* * * * *